E. WEINTRAUB.
HARD BODY FOR WEARING SURFACES AND THE LIKE.
APPLICATION FILED OCT. 27, 1909.
1,088,858.
Patented Mar. 3, 1914.
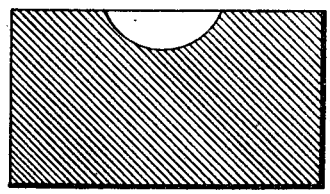
Witnesses:
Earl G. Klock.
J. Ellis Glen
Inventor:
Ezechiel Weintraub
by Albert B. Davis
His Attorney

UNITED STATES PATENT OFFICE.

EZECHIEL WEINTRAUB, OF LYNN, MASSACHUSETTS, ASSIGNOR TO GENERAL ELECTRIC COMPANY, A CORPORATION OF NEW YORK.

HARD BODY FOR WEARING-SURFACES AND THE LIKE.

1,088,858. Specification of Letters Patent. Patented Mar. 3, 1914.

Application filed October 27, 1909. Serial No. 524,940.

*To all whom it may concern:*

Be it known that I, EZECHIEL WEINTRAUB, a citizen of the United States, residing at Lynn, county of Essex, State of Massachusetts, have invented certain new and useful Improvements in Hard Bodies for Wearing-Surfaces and the like, of which the following is a specification.

It is the object of my present invention to produce a material suitable for use as meter jewels where sapphires are now used, and suitable for use as dies in place of diamonds, and so hard and so free from crystalline structure that it can be used as a cutting material of a metal-working tool, or for other purposes requiring a very hard, dense body, capable of resisting the action of constant friction.

I have discovered that boron, either pure or nearly pure can be fused into large pieces of conchoidal fracture with absence of any micro-crystalline appearance. This material is harder than sapphire, and is well adapted for use as the jewel of an electrical recording meter, and for dies, drills and metal-working tools of various kinds. The fused boron is devoid of crystalline structure, and in this respect is unique among very hard materials artificially produced, which could be considered in this connection.

The accompanying drawing is a section of a meter jewel somewhat enlarged.

According to one method of procedure, I reduce boric anhydrid in excess with magnesium. The resulting product contains boron associated with magnesium, or oxygen, or both, according to the proportions of the reacting materials and the temperature of the reaction. It is pressed into stick form, and heated in a vacuum furnace to a temperature of 1200 degrees, or over, to make the stick slightly conductive. The stick is then run as an electrode for a high potential arc operating in hydrogen of sufficient density to cause concentration of the arc on the end of the stick. A pressure of hydrogen to about five inches of mercury is ordinarily suitable. The treatment with a high potential arc is fully disclosed in my co-pending application Serial No. 524,947 of even date. This heat treatment drives from the stick its various impurities, and if it is sufficiently prolonged can be used to fuse the substance into a dense black, glass-like bead. By suitably regulating the current through the furnace, the bead can be held for a long time in a semi-molten condition, and thus freed from fissures or blow holes. The beads are then ready for the construction of meter jewels or dies, according to the method well understood in the art of jewel grinding and polishing.

For some purposes an admixture of carbon, silicon, magnesium or aluminum is desirable. This result can be obtained by mixing powdered graphite, silicon, or other desired element, with the impure boron before pressing the same into sticks for fusion in the arc furnace. By another method of making the hard bodies of boron, or boron associated with carbon, the chlorid of boron is reduced with hydrogen by passing a mixture of these materials into a high voltage alternating current arc maintained between water-cooled copper electrodes, as described fully in my co-pending application Serial No. 524,939 of even date. The heat of the arc sets up chemical action between the hydrogen and the chlorid, liberating finely divided boron in a pure condition, which is driven out of the active zone by the action of the arc blast. Some of the reduced boron fuses on the electrodes and grows into beads and rods. In this form the boron may be worked up at once into jewels or dies. Some of the reduced boron is thrown out on the walls of the arc chamber in a finely-divided condition. The powder is pressed into sticks, which are fused by being made the electrode of the high potential arc operating in hydrogen, or by fusing in a vacuum furnace of the Arsem type, which is provided with a tungsten resistance heater in case pure boron is desired. If a small amount of carbon is not objectionable in the boron a graphite heater can be used in the furnace. If the presence of carbon, silicon, or other element, in the bead is desired, it can be added to the powdered boron before pressing into sticks. As another means for melting pure boron, or a mixture of boron and carbon, I may use an arc furnace of the type in which the charge is pressed into a stick preheated to about 1200° as in an Arsem furnace and then operated as anode for a low voltage mercury arc running in hydrogen, as disclosed in my application Serial No. 346,253, filed December 4, 1906.

When fusing the charge by any of the procedures above described, the charge should be held molten, or semimolten for a time, sufficient to free it from microscopic fissures and irregularities.

The hardness, toughness and density of the boron after fusion, and the entire absence of crystalline structure render the material suitable for use in any relation where the working action is that of friction combined with intense pressure, such as the pivot bearing of an electrical meter. The high fusing temperature, above 2000 degrees C., is also a valuable characteristic of this material.

As another way of making dense bodies of boron, or of boron associated with carbon, I may proceed by building up rods or sticks by gradual deposition of the desired components on a thin filament of carbon or other suitable conductive material. Thus if a base filament be heated in boron chlorid and hydrogen, pure boron is deposited on the filament to such a depth that the conductor finally becomes a rod or stick consisting entirely of boron except for the relatively small carbon core on which the boron was initially deposited. Such a rod can be rendered dense and strong by sintering with current passed through the rod or in a tungsten vacuum furnace, and can be broken up into small lumps for cupping and polishing to form meter jewels and the like. If it is desired that the stick or rod of boron shall contain more carbon than that left by the original base filament, the deposition may be carried out in a gaseous mixture containing gasolene, carbon tetrachlorid, or the like, capable of breaking up to deposit carbon simultaneously with the deposition of the boron. This procedure is disclosed in my application, Serial No. 524,950, filed Oct. 27, 1910. These sticks can be sintered and otherwise finished much the same as the sticks of pure boron.

What I claim as new and desire to secure by Letters Patent of the United States, is—

1. A meter jewel composed of a hard, dense fusion consisting mainly of boron.

2. A meter jewel formed of a fused body of boron and carbon.

3. A pivot-bearing composed of a hard, dense fusion, consisting mainly of boron.

4. A pivot-bearing formed of a fused body of boron and carbon.

In witness whereof, I have hereunto set my hand this 26th day of October, 1909.

EZECHIEL WEINTRAUB.

Witnesses:
JOHN A. McMANUS, Jr.,
CHARLES A. BARNARD.